United States Patent
Jensen, Sr.

[11] Patent Number: 5,584,637
[45] Date of Patent: Dec. 17, 1996

[54] BALE LOADER FOR TRUCK WITH FOLD AROUND ARMS

[75] Inventor: James B. Jensen, Sr., Coffeyville, Kans.

[73] Assignee: Jensen International, Inc., Coffeyville, Kans.

[21] Appl. No.: 394,670

[22] Filed: Feb. 24, 1995

[51] Int. Cl.⁶ ................................. A01D 85/00
[52] U.S. Cl. ........................... 414/24.5; 414/111
[58] Field of Search ................. 414/24.5, 111, 414/555

[56] References Cited

U.S. PATENT DOCUMENTS

| | | | |
|---|---|---|---|
| 4,049,140 | 9/1977 | Roose | 214/147 |
| 4,090,624 | 5/1978 | Krein et al. | 214/77 |
| 4,091,946 | 5/1978 | Kraeft et al. | 214/518 |
| 4,155,518 | 5/1979 | Small | 242/86.5 |
| 4,498,829 | 2/1985 | Spikes | 414/555 |
| 4,564,325 | 1/1986 | Ackerman | 414/24.5 |
| 4,579,497 | 4/1986 | Nine | 414/24.5 |
| 4,594,041 | 6/1986 | Hostetler | 414/24.5 |
| 4,687,402 | 8/1987 | Zatylny | 414/24.5 |
| 4,722,651 | 2/1988 | Antal | 414/24.5 |
| 5,059,081 | 10/1991 | Brown et al. | 414/555 |
| 5,281,068 | 1/1994 | Bruce | 414/24.5 |

FOREIGN PATENT DOCUMENTS

| | | | |
|---|---|---|---|
| 2591062 | 6/1987 | France | 414/24.5 |

*Primary Examiner*—Karen B. Merritt
*Assistant Examiner*—Douglas Hess
*Attorney, Agent, or Firm*—Head Johnson & Kachigian

[57] ABSTRACT

A bale loader for use with a truck having a generally flat truck bed, the bale loader having first and second lifting arms each pivoted at its inner end adjacent opposite rear edges of the truck bed and the outer ends being pivotal towards and away from each other, the outer ends each having a bale spike for engaging a hay bale, the arms being pivotal by hydraulic action in a common plane whereby a bale may be lifted onto or off of the truck bed and a hydraulic cylinder/piston system is provided for moving the arms each into a stowed position wherein they extend along either side of the truck bed to leave the truck bed surface unobstructed.

9 Claims, 7 Drawing Sheets

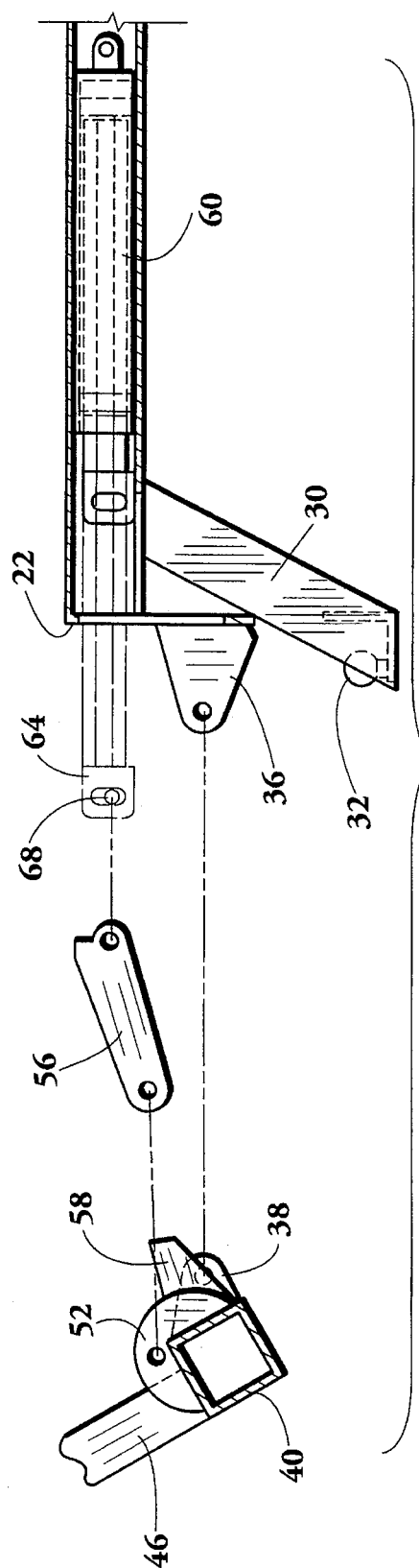
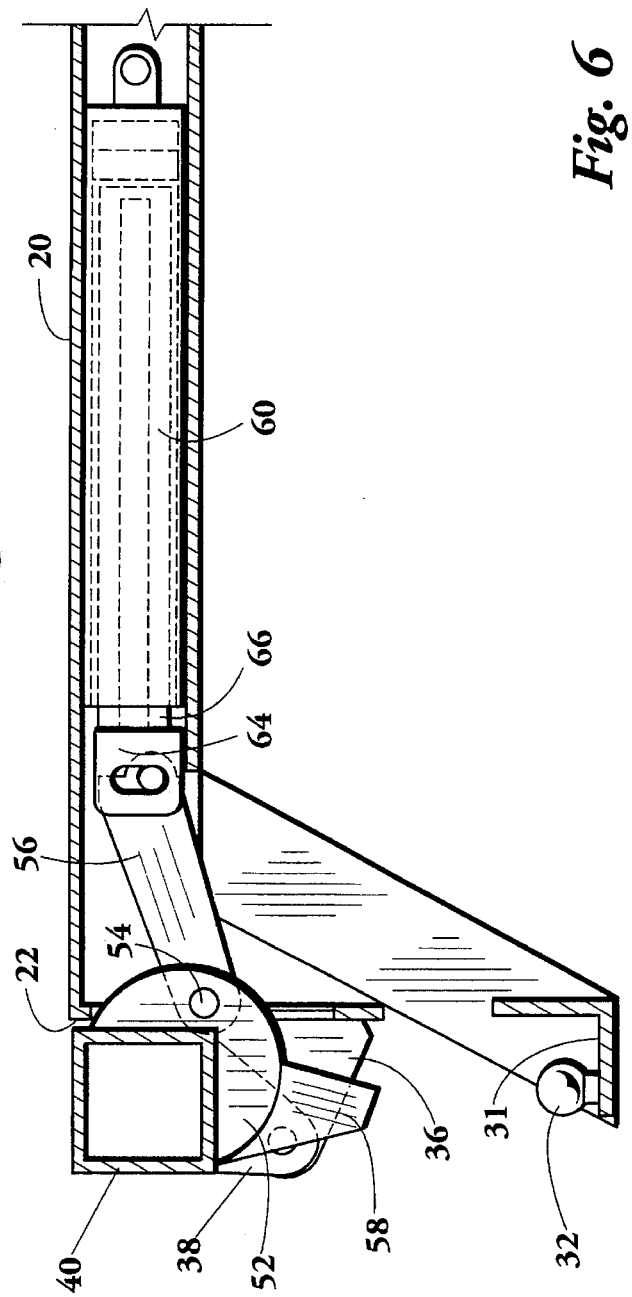
Fig. 7
Fig. 6

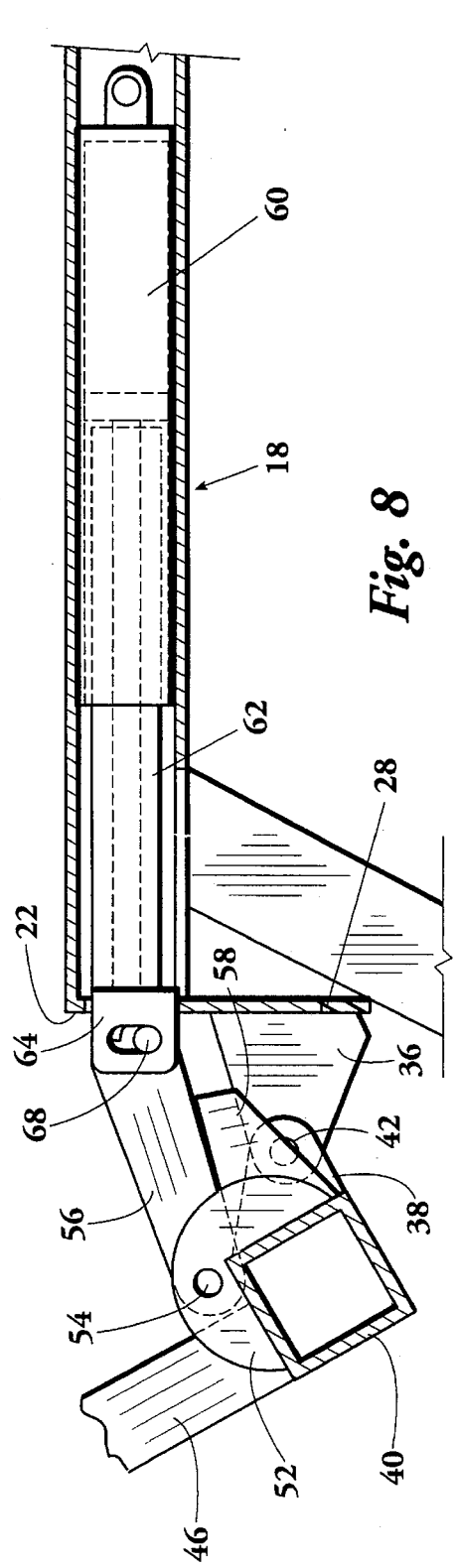
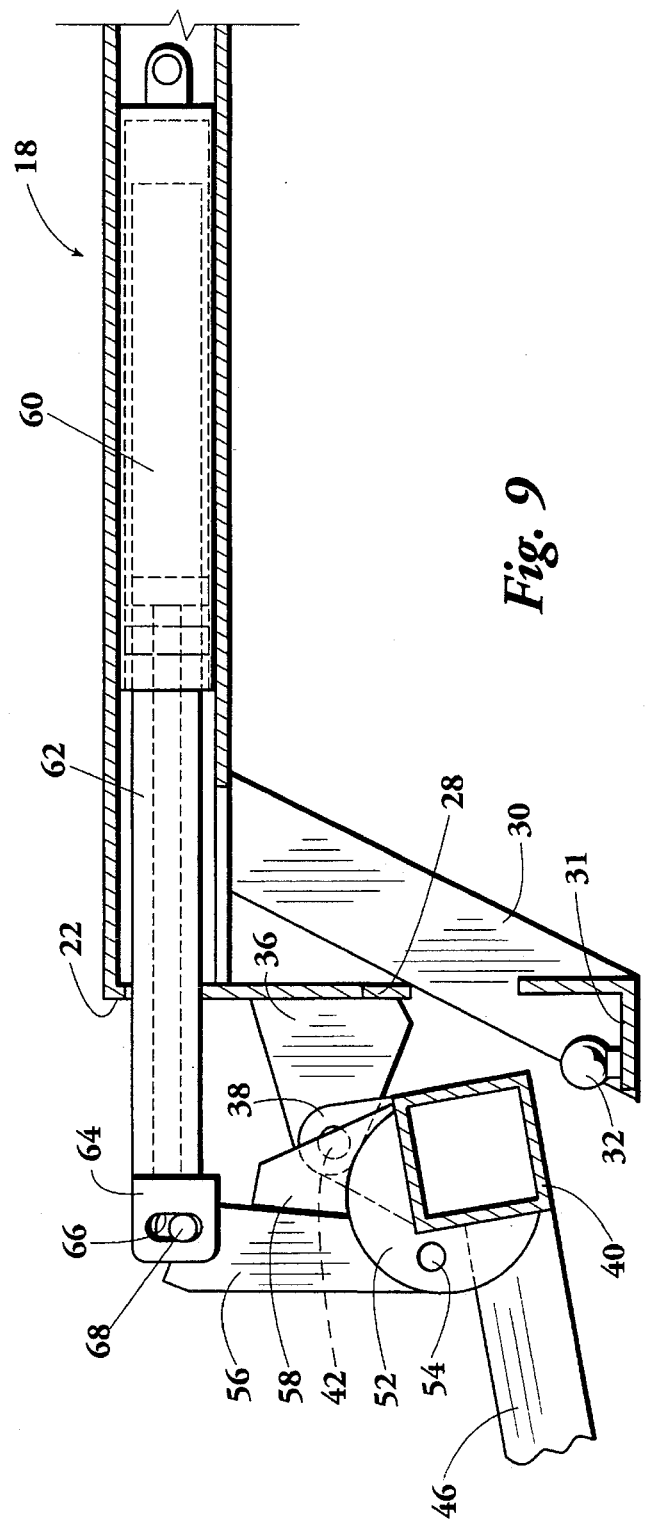

BALE LOADER FOR TRUCK WITH FOLD AROUND ARMS

CROSS-REFERENCE TO RELATED APPLICATIONS

This application is not related to any pending patent applications.

CROSS-REFERENCE TO MICROFICHE APPENDIX

This application is not related to any microfiche appendix.

BACKGROUND OF THE INVENTION

I. Technical Field

This invention relates to equipment for use on a flat bed truck for handling large bales of hay. The invention provides an improved low profile flush-mounted bale loader for moving bales onto and off of a flat bed truck, the system being unique in the manner in which the lifting equipment is stowed when not in use so as to leave the bed of the truck unobstructed.

II. Prior Art

A common means of gathering a hay crop after it has been cut in the field for preserving the hay for animal feed is to roll the hay into large round bales. These bales are typically up to five feet in diameter and length. Round bales of hay may weigh as much as 1500 pounds. Whereas in the past, hay was typically baled in square bales and tied with wire or other kind of twine, the most frequent practice today is the use of large round bales. One of the great advantages is that they shed themselves of water and therefore can be left in the field, that is, they do not have to be moved into a storage shed as do square bales. Further, round bales can be easily fed to livestock by unrolling the bales by rolling them across a feed area.

A disadvantage of large round bales is that they cannot be lifted manually and, therefore, power equipment is required for transporting and handling of large round bales.

The basic concept of using power equipment for handling round bales has been described, such as in U.S. Pat. Nos. 3,958,772 and 3,952,895. Soon after round bales became popular others devised concepts for the use of farm-type pickup trucks for handling the bales, such as disclosed in U.S. Pat. Nos. 4,090,624; 4,044,963 and 4,298,301.

Equipment that can be adapted to a flat bed truck in a way so that it will not interfere with the normal use of the flat bed truck is disclosed in U.S. Pat. No. 4,564,325 entitled "Flush Mounted Round Bale Mover For Truck Beds". This patent provides a system that preserves a flat bed truck for its normal use but requires the creation of clearance slots in the upper surface of the truck bed. The clearance slots receive the arms of the bale lift mechanism. Providing clearance slots in the surface of a truck bed is time consuming and expensive. In addition, the system of this invention that employs clearance slots requires the bale piercing spindles that are affixed to the outer ends of the lifting arms to be removed so that the arms can fit into clearance slots. This means that each time the lifting apparatus has to be used, the operator must actuate the mechanism to move the arms out of the clearance slots after which the lifting spindles are manually attached for use in moving a bale. Before the lifting arms can be moved back into the stowed position in the clearance slots, the piercing spindles must again be removed.

The invention described herein provides a system for use with a flat bed truck wherein the lifting arms are stowed against the outer sides of a flat bed truck eliminating the need for forming clearance slots in the truck bed. Further, by storing the arms along the outer edges of a flat bed truck the piercing spindles or bale spikes do not have to be removed since they can extend in horizontal openings formed in the truck bed side edges.

BRIEF SUMMARY OF THE INVENTION

An apparatus for lifting hay bales, or some similar object, onto or off of a truck is provided. The truck has a bed, at least a major portion of which is flat. The truck bed, having a top surface, has a rearward end and opposed exterior sides. Further, the truck is equipped with a source of hydraulic fluid pressure such as can be provided by a hydraulic pump driven by the truck engine and hydraulic controls positioned to be readily available to the truck operator.

A transverse beam is pivotally secured to the lower rearward end of the truck bed. The beam is in a horizontal plane or more precisely, a plane that is parallel to the plane of the truck bed. The transverse beam is pivotally controllable by a hydraulically actuated cylinder/piston that is secured to the truck bed.

A pair of lifting arms are each pivotally supported at their inner ends to the outer ends of the transverse beam. The lifting arms remain in a fixed plane of the transverse beam and are thereby pivoted in a common plane as the transverse beam is pivoted.

The outer ends of the lifting arms are provided with bale spikes that extend perpendicular to the arms for impinging on opposed ends of round hay bales.

First and second slide blocks are provided in the interior of the transverse beam at the opposed outer ends thereof. By the use of a hydraulically actuated cylinder/piston affixed to each slide block, the outer ends of the lifting arms can be pivoted towards or away from each other.

The transverse beam is pivoted in such a way that when the arms are moved to the stowed position, the beam lies contiguous to the truck bed rearward end and the arms extend along the truck bed opposed exterior sides. Spike openings are provided in the truck bed below the surface thereof to receive the bale spikes at the outer end of each of the lifting arms. The outer ends of the lifting arms can be spread apart so that the bale spikes extend outside the opposed outer ends of a hay bale. The arms can then be pivoted towards each other so that the bale spikes impale the bale to grasp the bale between the opposed outer ends of the lifting arms. The transverse beam can then be rotated to move with the bale, in a common plane, the lifting arms to lift the bale and swing it upwardly over the transverse beam and then downwardly onto the truck bed. When the bale is fully supported on the truck bed, the lifting arms can be spread apart to withdraw the bale spikes after which a second bale can be loaded on the truck, or the lifting arms can be returned to their stowed position wherein the bale spikes extend within pockets in the exterior sides of the truck bed.

When the lifting arms are in the stowed position the transverse beam is paralleled to and contiguous with the rearward end of the truck. The lifting arms extend along the opposed sides of the truck so that the entire upper surface of the truck bed is unobstructed.

DESCRIPTION OF THE DRAWINGS

FIG. 3 shows the lifting arms in the inward most position as would be employed in latching onto a hay bale or other object of the minimum width that can be grasped by the bale loader.

FIG. 6 is an enlarged partial cross-sectional view of the bale loading mechanism of this invention showing the position of the major components when the lifting arms (not shown) are in stowed position.

FIG. 7 is a partial cross-sectional exploded view of the major components of the bale loader of this invention with the transverse beam shown pivoted in an intermediate position wherein the arms extend upwardly and rearwardly.

FIG. 8 is a fragmentary cross-sectional view, taken along the line 8—8 of FIG. 2, showing the major components of the bale loader of this invention with the lifting arms positioned in an intermediate position as employed in lifting a bale onto or off of a truck bed.

FIG. 9 is an enlarged partial cross-sectional view as in FIG. 8 but showing the relationship of the components as the transverse beam has been pivoted to extend the arms rearwardly and downwardly such as to engage or disengage from a bale of hay resting on the earth's surface.

DESCRIPTION OF THE PREFERRED EMBODIMENTS

Figure 1:
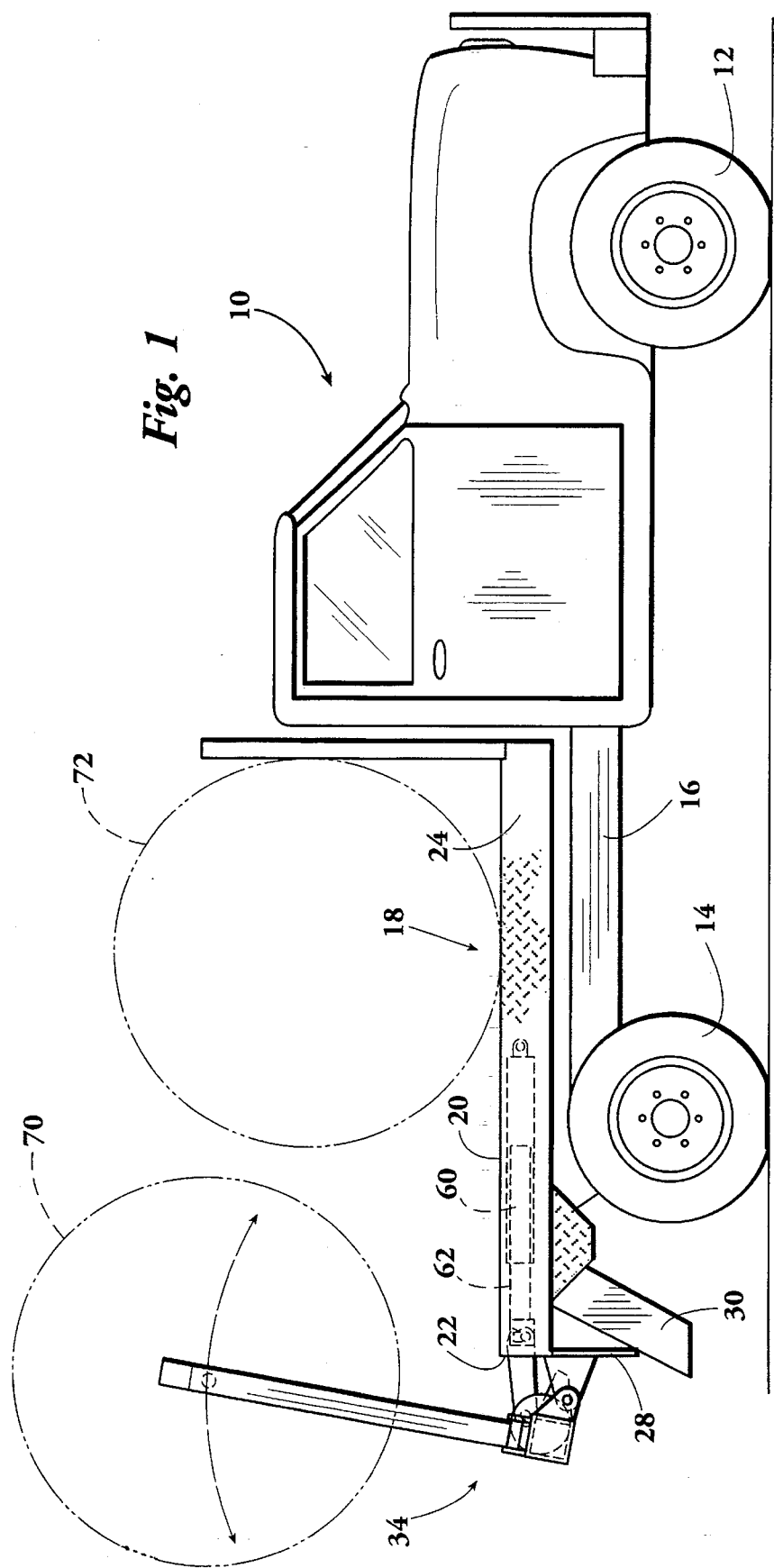
FIG. 1 is an elevational view of a truck having a flat bed and showing the bale loading mechanism of this invention secured to the truck bed and showing, in phantom view, one round bale of hay positioned on the truck bed and a second round bale of hay that is being loaded onto or loaded off of the truck bed.
Figure 2:
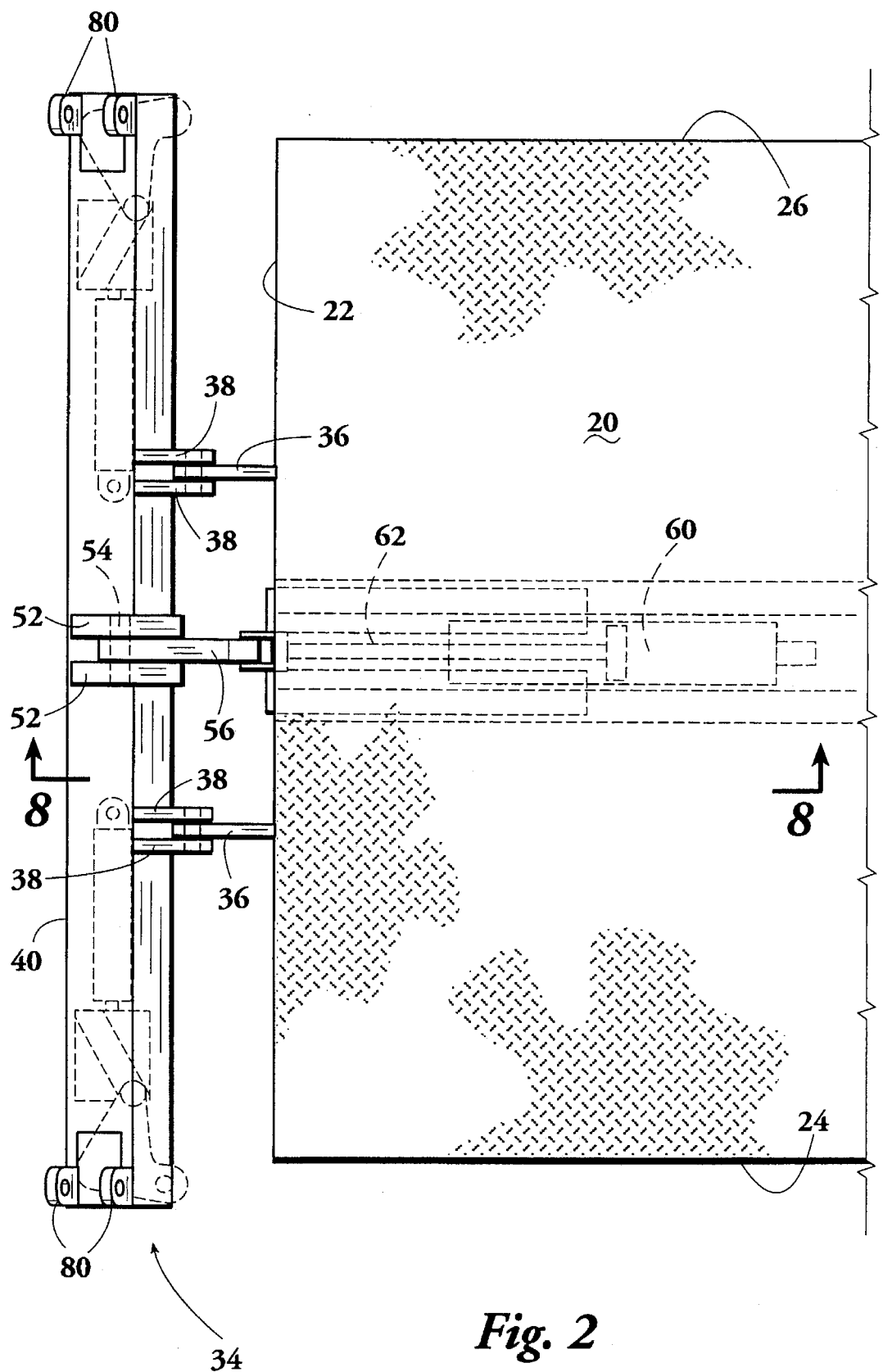
FIG. 2 is a plan view of the rearward portion of the truck bed, as shown in FIG. 1, showing the transverse beam of the bale loader pivoted so that the lifting arms (not shown in this figure) would extend upwardly and slightly rearwardly of the truck as in an intermediate position when a bale is being loaded onto or off of the truck bed.

Referring first to FIG. 1, a truck is indicated by the numeral 10. The truck has front wheels 12, rear wheels 14, and a frame 16 that supports a bed 18. Bed 18 has a top surface 20, a rearward end 22, as best seen in FIG. 2, a right exterior side 24 and left exterior side 26 (see FIG. 2).

Figure 4:
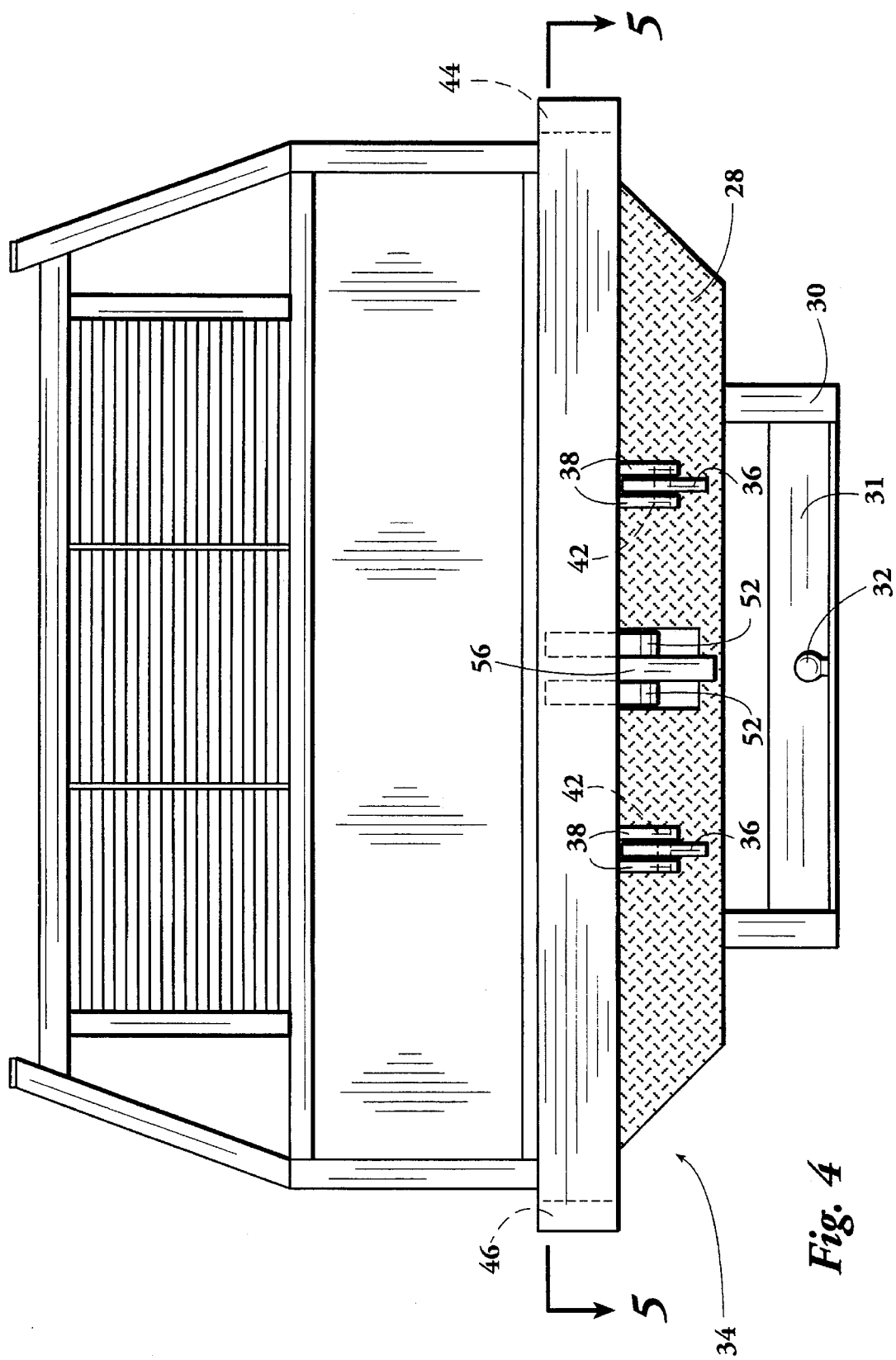
FIG. 4 is an elevational rearward view of a truck, as shown in FIG. 1, showing the transverse beam in the stowed position where it is pivoted to lie adjacent to the rearward end of the truck bed and wherein the lifting arms (not seen) lie adjacent to the bed side edges.

As shown in FIGS. 1, 8 and 9, there is affixed to rearward end 22 a tail board 28. As shown in FIGS. 1 and 4, affixed to the truck frame are downwardly and rearwardly extending trailer hitch brackets 30 that support drawbar 31 having a trailer hitch ball 32 so that a trailer can be pulled by truck 10.

The bale lift mechanism of this invention is supported at the truck frame rearward end 22 and is indicated generally by the numeral 34.

As shown in FIGS. 4, 8 and 9, there is affixed to and extending rearwardly from the truck frame spaced apart lift support brackets 36. Pivotally attached to each of the lift support brackets 36 are pairs of beam brackets 38.

Figure 5:
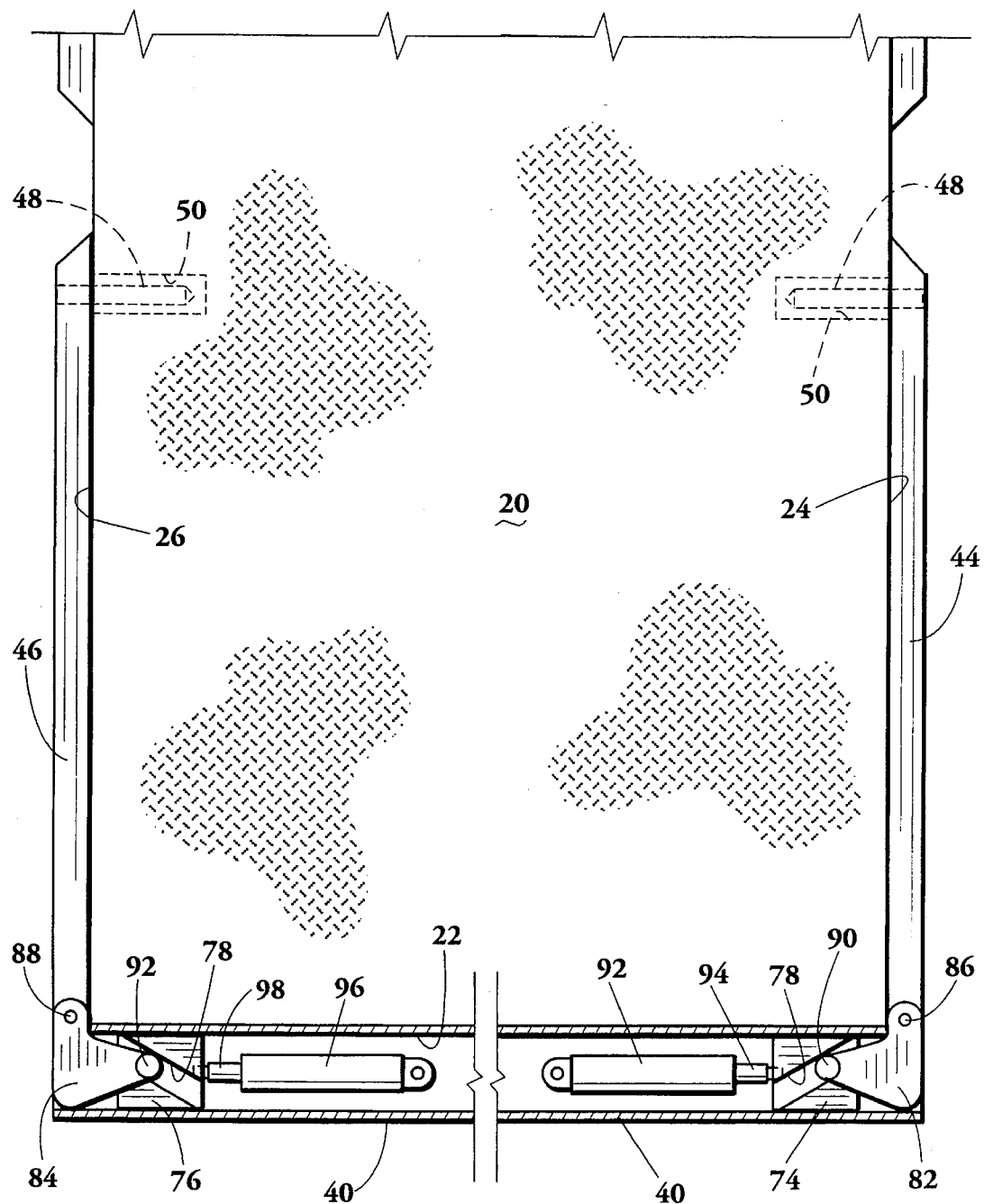
FIG. 5 is a cross-sectional view, taken along the line 5—5 of FIG. 4, showing the rearward portion of the bed of a truck and showing the transverse beam in cross-section and with the lifting arms in their stowed positions adjacent the edges of the truck bed.

A major component of the bale lift assembly 34 is transverse beam 40. In the preferred embodiment, transverse beam 40 is formed of a length of square metal tubing slightly longer than the width of truck bed 20. Transverse beam 40 is pivotally supported at the rearward end of the truck bed about pins 42. In its stowed position, as shown in FIGS. 5 and 6, transverse beam 40 is paralleled to and contiguous with frame rearward end 22. Pivotally supported to one end of transverse beam 40 is a right lift arm 44, and pivotally supported to the other end of transverse beam 40 is a left lift arm 46. FIG. 5 shows the lift arms in stowed positions wherein they are paralleled to and contiguous with the bed right exterior side 24 and left exterior side 26. Each lift arm 44 and 46 includes a laterally extending bale spike 48. When in the stowed position, bale spikes 48 are received in pockets 50 formed in exterior sides 24 and 26 of the truck bed, below the bed top surface 20. Lift arms 44 and 46 remain in a common plane with each other and the outer ends are pivotal towards and away from each other by mechanisms that will be described subsequently. The plane of the lift arms is pivotal with respect to the vertical by pivotation of transverse beam 40. FIGS. 2 and 6–9 show the mechanism by which the transverse beam is pivoted and thereby by which the lift arms 44 and 46 are pivoted in a common plane.

As seen in FIGS. 2 and 7–9, secured to beam 40 intermediate the ends thereof, is a pair of spaced apart beam control brackets 52. Supported about a pin 54 is one end of a beam linkage 56. Also secured to beam 40, and positioned between beam control brackets 52, is a pull brace 58. Secured to the truck bed and frame and positioned below bed top surface 20 and centrally between the bed right and left side edges 24 and 26 is a lift control cylinder 60 having a piston rod 62 extending from it. At the outer end of piston rod 62 is an adapter 64 having a vertical slot 66 therein. Received in slot 66 is pin 68 that is also received in an opening in one end of beam linkage 56.

Figure 3:
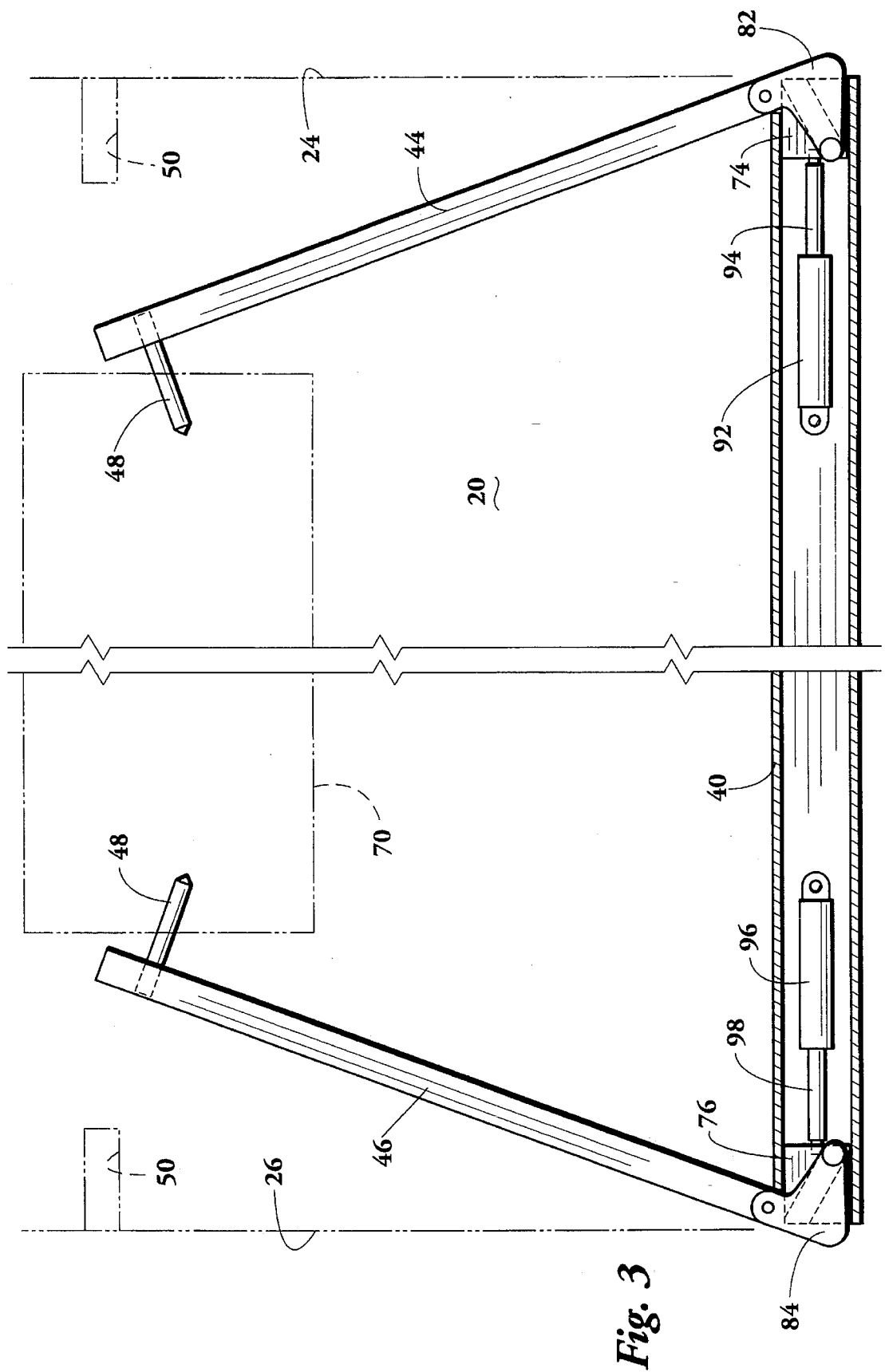
FIG. 3 is a plan view, shown partly in cross-section, with a rearward portion of a truck bed shown in phantom outline and showing the transverse beam in cross-section. This view shows the hydraulic cylinders employed for moving slide blocks that control the angular relationship between the lifting arms and the transverse beam whereby the outer ends of the lifting arms may be pivoted towards or away from each other.

When hydraulic cylinder 60 is actuated to withdraw piston rod 62 force is applied on beam linkage 56. This force is transmitted to pull brace 58 to cause transverse beam 40 to pivot about pins 42. FIG. 9 shows transverse beam 40 pivoted so that arms 44 and 46 (only arm 46 being seen in FIGS. 7, 8 and 9) extend rearwardly and downwardly from the pickup bed to the position as shown in FIG. 3 wherein a round bale of hay 70, shown in dotted outline in FIG. 3, may be impelled by bale spikes 48. As piston rod 62 is withdrawn by cylinder 60, beam linkage 56 bears against pull brace 58 to pivot beam 40 and thereby arms 44 and 46 so that the arms move in a common plane with the beam. If the arms have a bale of hay grasped between bale spikes 48, the bale can be raised up and over the truck bed 18 to the position where the bale rests on truck bed top surface 20 as shown in FIG. 1. FIG. 1 shows bale 70 as supported between the lift arms with another bale 72 that is at rest on the pickup bed top surface 20.

When a bale has been loaded onto bed top surface 20, lift arms 44 and 46 may be spread apart so that the bale spikes 48 disengage from the bale, after which the transverse beam 40 may be further pivoted towards the rearward end 22 of the truck bed to the point where the transverse beam is contiguous to the truck bed rearward end 22 as shown in FIGS. 5 and 6. When the transverse beam and the lift arms have been pivoted to the forward most position wherein the lift arms 44 and 46 extend to either side of truck bed exterior sides 24 and 26, the arms may be pivoted towards each other. When this is done, bale spikes 48 enter into pockets 50 in the sides of the truck frame and the lift arms 44 and 46 rest contiguous with the truck exterior sides 24 and 26 and even with or below the truck bed top surface 20.

The mechanism by which the lift arms are pivoted towards or away from each other will now be described with particular reference to FIGS. 2, 3 and 5. Slidably positioned within transverse beam 40 adjacent frame right side edge 24 is a first slide block 74. A similar slide block 76 is positioned within the transverse beam adjacent left side edge 26. Each of the slide blocks 74 and 76 have a slot 78 formed in it.

Affixed to transverse beam 40 at each of the outer ends thereof are opposed pairs of lift arm support brackets 80 (see FIG. 2). Pivotally supported between lift arm support bracket 80 at the rear right side edge 24 of the truck bed is a right lift arm gusset plate 82 and, in like manner, pivotally supported to the lift arm support brackets 80 at the truck frame rearward left side edge 26 is a left lift arm gusset plate 84. Right gusset plate 82 is pivotally supported to lift arm support bracket 80 by means of a pin 86 and left lift arm gusset plate 84 is supported to lift arm support brackets 80 by a pin 88. A roller 90 is secured to gusset plate 82 and is slidably received within slot 78 in right slide block 74. A roller 92 is received in slot 78 in left slide block 76.

Right slide block 74 is laterally positioned within transverse beam 40 by a cylinder 92. Piston rod 94 extending from cylinder 92 is connected to right side block 74. In like manner, a cylinder 96 supported within transverse beam 40 has a piston rod 98 that is attached to slide block 76.

When hydraulic pressure is supplied simultaneously to cylinders 92, 96 to move piston rods 94 and 98 outwardly with respect to the cylinders to push slide blocks 74 and 76 away from each other, the rollers 90 and 92 acting in slots 78 cause brackets 82 and 84 to move lifting arms 44 and 46 towards each other, since the inner end of right lift arm 44 is attached to gusset 82 and the inner end of left lift arm 46 is attached to gusset 84. Contrarily, when hydraulic pressure is supplied simultaneously to cylinders 92 and 96 to withdraw piston rods 94 and 98 and thereby move slide blocks 74 and 76 towards each other, rollers 90 and 92 acting in slots 78 cause gussets 82 and 84 to pivot lift arms 44 and 46 away from each other. By means of hydraulic controls (not shown) located in the cab of truck 10, an operator can control the direction of hydraulic fluid flow simultaneously to cylinders 92 and 94 to control the attitude to lift arms 44 and 46 with respect to each other.

To operate the system, an operator first moves the lift arms from the stowed position by actuating cylinders 92 and 96 to pivot arms 44 and 46 away from each other causing the bale spikes to be withdrawn from pockets 50. Thereafter the arms are pivoted in a common plane by applying hydraulic fluid pressure to cylinder 60 to move the arms either to engage a hay bale that is already positioned on truck bed top surface 20 or to engage a hay bale resting on the earth's surface rearwardly of the truck. By reversing the direction of pivotation of the arms, the hay bale can be moved onto or off of the truck bed as desired. After a bale is set on the ground or set on the truck bed, contact with the lift arms is removed by actuating cylinders 92 and 96 to move the outer ends of the lift arms away from each other.

The arrangement of the bale loading system of this invention has many advantages over the prior art. The bale lift assembly 34 has a low profile, that is, when it is in the stowed position none of the portions of the bale lift extends above the truck top surface 20. Most important, the lift arms are moved and stowed against the exterior sides of the truck frame thus eliminating the need for slots in the truck bed surface. When in the stowed position, the lift arms do not interfere with the flat upper surface of the truck bed.

The mechanism for moving the lift arms towards and away from each other is contained entirely within the interior of transverse beam 40 so that these mechanisms are protected from the weather and from dirt and dust.

Another advantage of the low profile bale lift system is that it does not interfere with the use of trailer hitch ball 32 as supported by trailer hitch bracket 30 and drawbar 31 and thus, does not interfere with the use of the truck for the normal duty of pulling a trailer. That is, the drawbar can be used in the normal way without interference from the bale loader system. In addition, the low profile of the bale lift system permits the truck bed to be mounted closer to the truck frame allowing the truck bed to be lower to the ground. The mechanical arrangement for moving the lift arms result in low cylinder force requirements and the assembly is adaptable to be constructed without requiring the need for grease fittings.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for lifting an object onto or off of the bed of a truck, the truck having a source of hydraulic fluid pressure, the truck bed having a top surface, a rearward end and opposed first and second exterior sides, comprising:

a first and a second lifting arm, each lifting arm has an inner end and an outer end;

means for pivotally securing said first lifting arm inner end adjacent to said truck bed rearward end and said first exterior side and means for pivotally securing said second lifting arm inner end adjacent to said truck bed rearward end and said second exterior side;

an object engaging means adjacent said outer end of each of said first and second lifting arm;

means responsive to said hydraulic fluid pressure source for pivoting said lifting arms to move said outer ends towards and away from each other to grasp or release an object therebetween;

means responsive to said hydraulic fluid pressure source to pivot said arms in a common plane whereby an object may be lifted onto or off said truck bed; and means responsive to said hydraulic fluid pressure source to simultaneously pivot said arms into stowed positions paralleled to and exteriorly of said truck bed opposed first and second exterior sides whereby said inner ends of said lifting arms are stowed against said truck bed's first and second exterior sides completely removed from said truck bed's top surface.

2. An apparatus according to claim 1 wherein said truck bed has a generally planar upper surface and wherein said lifting arms when in said stowed positions are even with or below said upper surface.

3. An apparatus according to claim 1 wherein said object engaging means adjacent said outer end of each of said arms is in the form of a short length spike extending perpendicular to each said lifting arms and wherein each said truck bed exterior sides has a pocket therein that receives a said bale spike when said lifting arms are in said stowed position.

4. An apparatus according to claim 1 wherein said inner ends of each of said lifting arms are pivotally attached to a transverse beam and are moveable in a common plane with said transverse beam to lift an object onto or off of said truck bed;

pivot means supporting said transverse beam paralleled to and adjacent said truck bed rearward end; and means responsive to said hydraulic fluid pressure source to pivot said transverse beam relative to said truck bed to thereby pivot said lifting arms in a common plane.

5. An apparatus according to claim 4 wherein said means responsive to said hydraulic fluid pressure source to pivot said transverse beam is a cylinder having a piston rod extending telescopically therefrom acting in a plane substantially parallel to a plane of said truck bed.

6. An apparatus according to claim 4 wherein said means to pivot said lifting arms outer ends towards and away from each other includes first and second piston/cylinders each connected at a first end to said transverse beam and at a second end to a said lifting arm.

7. An apparatus according to claim 4 wherein said transverse beam is mounted close to said truck rearward end in a low profile arrangement permitting said truck bed to be supported lower to the ground.

8. An apparatus according to claim 4 wherein said lifting arms are, when in said stowed positions, at least substantially perpendicular to said transverse beam.

9. Apparatus for lifting an object onto or off of the bed of a truck, the bed having a top surface, the truck having a source of hydraulic fluid pressure, the truck bed having a rearward end and opposed first and second exterior sides, each having a pocket therein extending below the bed top surface, comprising:

a first and a second lifting arm, each lifting arm having an inner end and an outer end;

means for pivotally securing said inner end of each of said first and a second lifting arms to said truck bed rearward end;

a perpendicularly extending spike affixed adjacent said outer end of each of said first and second lifting arms;

means responsive to said hydraulic fluid pressure source of pivoting said lifting arms to move said outer ends towards and away from each other to grasp or release an object therebetween;

means responsive to said hydraulic fluid pressure source to pivot said arms in a common plane whereby an object may be lifted onto or off said truck bed and means responsive to said hydraulic fluid pressure source to simultaneously pivot said arms into stowed positions adjacent and paralleled to said truck bed opposed first and second exterior sides with each said spike extending into a said pocket.

* * * * *